(12) United States Patent
Wolff et al.

(10) Patent No.: US 9,450,769 B2
(45) Date of Patent: Sep. 20, 2016

(54) UNIFIED ONLINE CONVERSATION APPLICATION AND PLATFORM

(75) Inventors: Adam Gregory Wolff, San Francisco, CA (US); Kent Alexander Libbey, Palo Alto, CA (US); Pablo Kang, San Francisco, CA (US); Peter Damian Andrea, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 1014 days.

(21) Appl. No.: 12/786,365

(22) Filed: May 24, 2010

(65) Prior Publication Data

US 2011/0010641 A1 Jan. 13, 2011

Related U.S. Application Data

(60) Provisional application No. 61/216,936, filed on May 22, 2009.

(51) Int. Cl.
*H04L 12/18* (2006.01)
*G06Q 10/10* (2012.01)
*G06Q 50/00* (2012.01)

(52) U.S. Cl.
CPC ......... *H04L 12/1813* (2013.01); *G06Q 10/107* (2013.01); *G06Q 50/01* (2013.01)

(58) Field of Classification Search
CPC .............. G06Q 50/01; G06Q 10/107; H04M 1/72552; G06F 17/30864; H04L 12/1813; H04L 51/04; H04L 51/32; H04L 51/36
USPC .......................... 715/753, 758, 788; 705/319
See application file for complete search history.

(56) References Cited

U.S. PATENT DOCUMENTS

| | | | |
|---|---|---|---|
| 7,421,660 B2 | 9/2008 | Charnock et al. | |
| 7,761,507 B2 * | 7/2010 | Herf et al. | ..................... 709/204 |
| 9,031,216 B1 * | 5/2015 | Kamvar | .................. H04M 3/56 |
| | | | 379/202.01 |
| 2006/0090137 A1 * | 4/2006 | Cheng et al. | .................. 715/758 |
| 2006/0294189 A1 * | 12/2006 | Natarajan | .......... G06F 17/30864 |
| | | | 709/206 |
| 2007/0266105 A1 * | 11/2007 | Wu | ....................... H04L 12/1831 |
| | | | 709/206 |
| 2008/0097975 A1 * | 4/2008 | Guay et al. | ......................... 707/4 |
| 2009/0006411 A1 * | 1/2009 | Lele et al. | ......................... 707/9 |
| 2009/0063991 A1 | 3/2009 | Baron et al. | |
| 2009/0198775 A1 * | 8/2009 | Keinan et al. | ................. 709/205 |
| 2009/0254840 A1 * | 10/2009 | Churchill et al. | ............. 715/753 |
| 2010/0138756 A1 * | 6/2010 | Saund et al. | .................... 715/758 |

OTHER PUBLICATIONS

PCT International Search Report and Written Opinion, PCT Application No. PCT/US2010/035993, Jul. 16, 2010, five pages.

\* cited by examiner

*Primary Examiner* — Doon Chow
*Assistant Examiner* — Christopher J Fibbi
(74) *Attorney, Agent, or Firm* — Fenwick & West LLP

(57) ABSTRACT

A user interface is provided for conducting online conversations that span asynchronous and synchronous modes of communications. Users can initiate a new conversation or find existing conversations by choosing images of friends from a drop down list based on text input of friends' names. Conversations are represented in a tree-branch configuration such that new comments added to a conversation are associated directly to the existing comments to which they respond. Branches can be opened or collapsed automatically or at the users' option, allowing the user focus his attention on part(s) of the conversation. Content from the web can be searched and found content can be included into the body of a comment. All participants in a conversation see the same representation of the conversation and links to referenced Web content are maintained in tact regardless of the length and complexity of the conversation.

22 Claims, 12 Drawing Sheets

FIG. 3C

Conversation One [Search] [New]

Kristina Commented (1:38pm 5.19.09) That sounds like fun, count me in.

Raoul commented (1:42pm 5.19.09) Great! We'll see you there. Remember to bring your sleeping bag and some food for breakfast.

Kristina Commented (1:50pm 5.19.09) Going to be a great trip! I've included a great video from last year's outing – your 'breakfast' comment reminded me of that ridiculous feast we had that I captured forever on tape – Check it out!

[Video]

Bob commented (1:39pm 5.19.09) I'm not sure if I can make it this year. I have a lot of work to do before June. Drat. I'll see if I can figure something out.

Raoul commented (1:40pm 5.19.09) Here's a great photo of the campsite. I have a few others of the winery tour. I'll post them in a bit... Does that convince you to do your work another day Bob? You'll have plenty of time to finish up if you just assert yourself and lay off the Scramble – no more online games for you mister.

[Photo]

Kristina commented (1:40pm 5.19.09) Bob! What are you talking about? You have to be in attendance. Absolutely required. End of story.

Bob commented (1:55pm 5.19.09) Thanks guys. I'll see if I can get it sorted out. I would love to be there. btw, I'm down to 3 games per day of Scramble.

Raoul commented (1:44pm 5.19.09) Kristina speaks it like it is. Truth.

Raoul is typing...

FIG. 3C-1

UNIFIED ONLINE CONVERSATION APPLICATION AND PLATFORM

CROSS REFERENCE TO RELATED APPLICATIONS

This application claims the benefit of U.S. Provisional Application No. 61/216,936, filed May 22, 2009, which is incorporated by reference in its entirety.

BACKGROUND

This invention relates generally to creating, delivering, reading and responding to on-screen conversations over a distributed computer network.

Online communications typically involve a person initiating a text message with one or more other person(s) on a subject of common interest by using a software application on a computer or other network-connected device. Recipients of the message are notified of the communication and can respond through a compatible software application on a computer or device connected to a common network. Whether or not an online communication has a designated subject or topic, the subject matter may change in the course of communications, and so may the participants. Changing topics and/or participants in the course of interpersonal communications is a natural and common attribute of conversation, regardless of the medium—be it in person, via voice communications or through textual, online communication applications.

Examples of existing online communications include electronic mail (email), instant messaging (IM) and short messaging services (SMS, aka 'texting'). Currently, online communications are hindered by segregated platforms and applications for different modes of communication. For example, email is optimized for asynchronous online messaging, while instant messaging is optimized for synchronous online communications and SMS is optimized for mobile messaging. Even within the same online communications channel (e.g., email), different human interfaces and different methods of storing and transmitting data result in different views of the communications among participants in the same conversation. Indeed, the view of a given participant may change depending on which type of network-connect device and what network(s) she is using to conduct an ongoing communication. All of these factors result in discontinuous and disjointed conversations, even without changes in the participants or initial topic. In the absence of a unified online application and platform for online communications, each participant is effectively required to reconstruct a multi-channel conversation in his or her own imagination.

Furthermore, the lack of rich content integration by text-oriented online communications applications limits the ability of people to express their thoughts. If the adage that 'a picture is worth a thousand words' is true, then trillions of words are forgone every day by the inability of current online communication to convey images, or audio or video. Even as the World Wide Web has transformed from a text- and page-oriented medium into a highly expressive and dynamic environment—rich with images, audio and video—online communications have remained largely textual and static in nature. In the cases of email and instant messaging, rich content has to be either attached as a separate file or inserted as a hypertext link—links that are often broken in the transmission process. Where file attachments are involved, each recipient must store a separate copy of the file—sometimes multiple copies if more than one application client is used. As for SMS, it simply does not support images, audio or video, which has forced the advent of yet another segmented online communication application to accommodate rich media in the mobile environment—namely, Multimedia Messaging Service, or MMS.

While some so-called 'social networks' are to some limited extent more compatible with rich Web content, they are also are much more oriented to multicast or broadcast communications and not to private communications among a select group of participants.

In addition to being limited in support for rich content and media, today's online communication applications and platforms are limited in their ability to support model the natural flow of human conversation. Email, IM and SMS are appropriately described as messaging applications and platforms—indicative of their inherent design bias toward terse and task-oriented communications. This bias is evidenced by the user interface metaphor of email—an office memorandum, complete with the anachronistic term of 'carbon copy.' An office memo may be a good model for communications with a specific purpose (e.g., the time and location of a staff meeting), but the structure and layout of email does not lend itself to the natural flow of conversation, and the same is true of IM and SMS. For instance, email, instant messaging, and SMS applications all show messages in chronological sequence rather than by topical or logical relationship. Simple 'threading,' or grouping, of messages by topic is sometimes offered by email applications as a visual aid to help users to follow the flow of a conversation. But threading is, at best, a superficial solution to a fundamental deficiency in today's online communications.

Finally, online communications applications are not well integrated with the rapidly evolving category of online 'social networks.' For example, online communications applications generally use a separate a static database of contacts, requiring input and maintenance by each user. While there are services that synchronize contact lists among different online communications applications (and different computers and devices used to interface with these applications), these services are often costly and they still require each user to maintain her set of contacts independently. By contrast, social networks offer a much more dynamic approach to contact, or 'friend,' management. Each member of the social network provides and maintains his own profile (including images and contact information), which is then shared with and automatically updated for all of his friends. While some social networks have started to provide simple email-like and IM-like online communication applications for communication between select friends (rather than the more typical mode of social network communication—to all friends), these have more limited functionality than dedicated online communication applications of email and IM.

SUMMARY

Embodiments disclosed herein include a software application, including a graphical user interface, and underlying server technologies designed to support online conversations that, for example:

(a) are conducted both asynchronously (i.e., where two or more participants respond to each other at different times) and synchronously (i.e., where participants respond simultaneously);

(b) seamlessly integrate rich content from the web—including images, audio and video—without leaving the user interface;

(c) accommodate the natural flow of topics within a single, continuous conversation through novel methods relating to the insertion and representation of new comments;

(d) leverage the presence of social networks, integrating profiles, images and contact information of friends in a way that is continuously and automatically updated for all users.

Various embodiments span different modes of communications. In some embodiments, the user interface and underlying technology is designed with the expectation that a single conversation among the same participants can be conducted both asynchronously (i.e., where two or more participants respond to each other at different times) and synchronously (i.e., where participants respond simultaneously). These different uses cases are addressed, for example, through stored and real-time notifications of conversation updates.

While there are current examples of email and instant messaging applications that are bundled by a service provider on a single 'home' screen, these applications remain segregated in function and content. And while use cases of email and instant messaging and texting sometimes overlap—for instance, email messages are sometimes exchanged so quickly that they feel like instant messages and instant messages are sometimes posted knowing that the other party is not present—these use cases are outside the design boundaries of current online communications applications, driving users back to multi-modal online conversations.

Various embodiments support the seamless integration of rich content from the web—including images, audio and video. For example, a search function is integrated within the conversation editor, allowing users to find, insert and view relevant web content without leaving the application or the conversation flow. Search results are presented in a consistent, graphical form (including a representative image where possible) rather than a hypertext link. Search results that refer to specific media types (e.g., audio or video content) are recognized by the application, allowing users to 'play' the content before adding it to the conversation—and allowing recipients to play the content within the conversation view. All participants in the conversation see exactly the same representation of web content and links back to the content's site of origin are maintained intact, no matter how long or complex the conversation.

In contrast to this integrated approach, existing online communications of email, instant messaging and SMS treat web content as separate, foreign objects. Perhaps this is because the invention of email predated the advent of the World Wide Web by over a decade. But for whatever reasons, email, instant messaging and SMS all force users to: 1) leave the respective communications application; 2) find the content to be shared in a web browser through a search or otherwise; 3) copy the URL from the browser, and 4) paste the URL of the web content into the conversation editor. In the best-case scenario, the reverse process occurs upon receipt of the message—that is, the recipient clicks the link in the message, which automatically the link in a web browser. However, this often fails because many URLs are so long and complex they span more than one line in a message (such as with Google Map URLs) so that the links are broken by the time they are received. In addition to frustrating recipients, the presence of URL strings clutters the messages and disrupts the natural flow of the conversation.

In some embodiments, the user interface uniquely embraces and models the natural flow of conversations. Conversations can start with one topic but wander to others and then circle back. The user interface, and the underlying content messaging system, is designed with this these characteristics in mind. It is simple to respond to a specific comment in a conversation—regardless of its chronological order—and to make that intent is clear to all participants in the conversation. Conversations are represented in a tree-like structure in comments and their respective responses are shown as branches. These branches can be expanded or collapsed, either automatically or at the user's option, making it easier to follow and contribute to long and complex conversations.

By contrast, conventional online communications applications simply present a stream of messages in the chronological order they were posted. While some email clients offer the option to 'thread' conversations these are superficial groupings of message with the same topic. Thus unrelated messages that happen to have the same topic are erroneously grouped in the same 'thread.' Like email, instant messaging and SMS applications simply show posts in the sequence they were received by the server. If more than one participant is typing at the same time (a common occurrence) comments and responses often appear as non-sequiturs. This situation is exacerbated by differences in the speeds of network connections, computers and typing among different participants.

Finally, various embodiments leverage the existence and contents of rapidly evolving social networks. For instance, the user interface provides access to existing friend lists from Facebook (including their friends' pictures, profiles, phone numbers and other information). This not only saves users the tasks of setting up and maintaining individual 'address books,' it also creates a richer and friendlier online communications environment. Users see images of their friends throughout the application interface and these images are used to facilitate starting, filtering and adding to conversations. Other social networks, in addition to Facebook, can be integrated in the same way through a platform designed to support automated application programming interfaces (APIs) and to accommodate a wide range of heterogeneous data schema across these various social networks.

Existing online communications applications take a very different approach to personal contacts and friend lists. Separate contacts list are entered and stored in each different application—one for email, another for instant messaging and so on. While there are services that synchronize contact lists among these disparate applications, their use is limited by their complexity and cost. And while most instant messaging applications allow users to post personal images, this feature is commonly overlooked or ignored (in contrast to social networks where posting a personal image is much more the norm).

Various embodiments described herein provide a method, apparatus and a computer readable storage medium including executable computer instructions for initiating, delivering, viewing and contributing to private online conversations over a distributed computer network. Using an online application within common Internet browser using standard Internet protocols, a user can initiate a conversation or view and contribute to ongoing conversations. A user interface is provided that provides a rich and graphical user experience, including the ability to see images of participants in the initiation, filtering and viewing of conversations. These images are, in part, acquired and updated through automated application programming interfaces (or APIs) between the unified online conversation application/platform and external online social networks. The user interface is designed to accommodate a natural flow of conversation topics with the contents of the conversation being presented in a visual tree-and-branch configuration, which presents comments in their logical relationship, not just their chronological sequence. In addition, within the user interface, a user can search the World Wide Web for rich content, including formatted text, images, audio and video, and include that content seamlessly into a comment in an online conversation.

BRIEF DESCRIPTION OF THE DRAWINGS

FIGS. 3A, 3B, 3C, 3C-1, 3C-2 3D, 3E and 3F show a detail view of a single conversation, including methods for reading, collapsing and expanding conversation tree branches; positioning the insertion of new comments in the context of existing comments; adding and editing comments; and integrating rich content from the Web into a comment through a built-in interface to web search engines in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
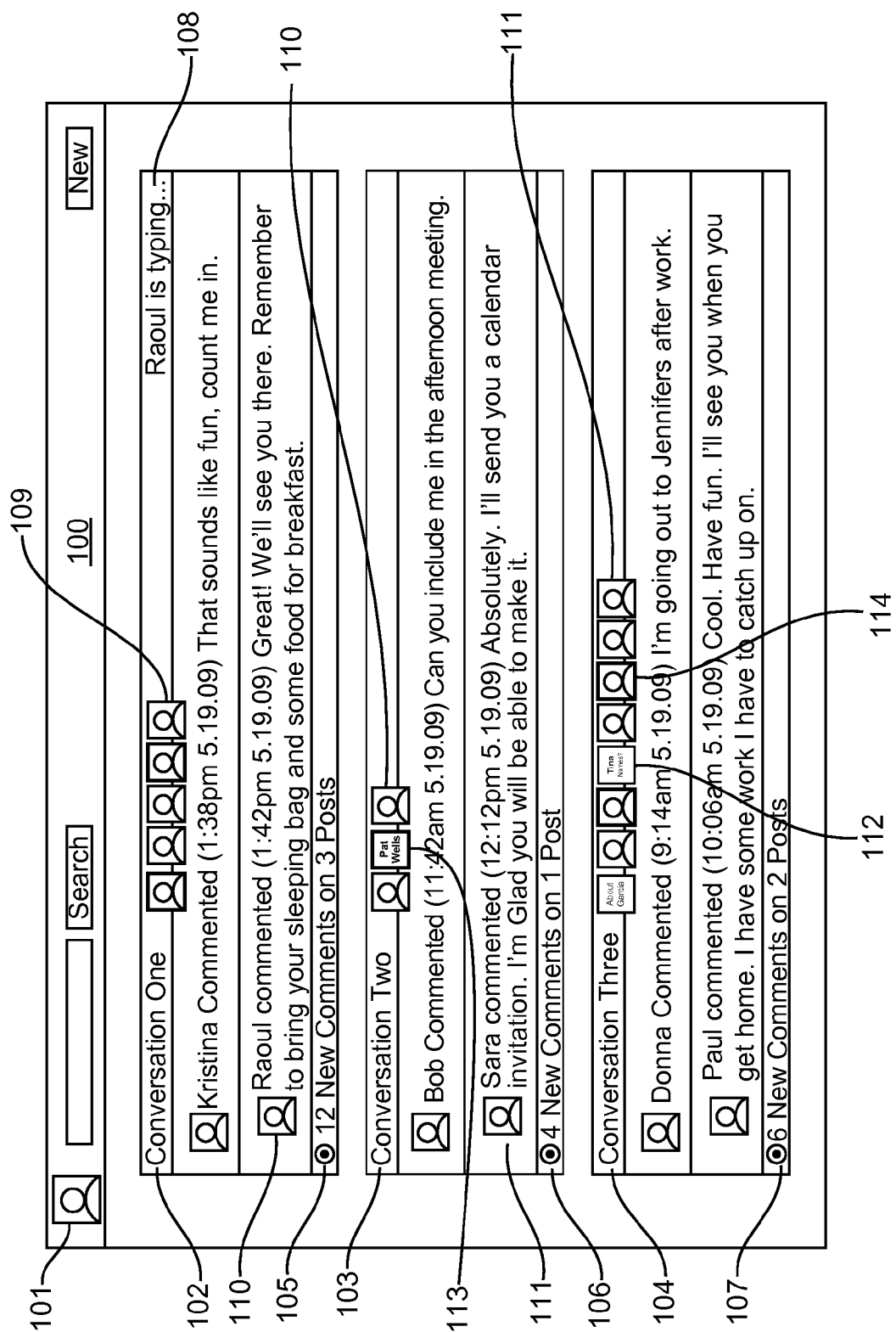
FIGS. 1A and 1B depict the home screen of the application, including a summary of all recent updates to ongoing conversations and the ability to filter conversation by a participant in accordance with some embodiments.

In some embodiments, a consumer software application that is hosted within a common Internet browser is provided. As such, the user is not required to install any software on to her computer; rather she has access to the software application simply to directing the browser to a specified web address. FIG. 1A represents the core components of the home screen 100 of the application with an image of the user 101 prominently displayed. This image 101 is the same representation of the user seen by others participants in the user's conversations. The home screen 100 shows short summaries of all conversations 102, 103, 104 in which the user is a participant. For each conversation summary, there is a notification of new comments since the last visit to the site 105, 106, 107. In the event that a participant in one of the conversations is currently adding a comment to a conversation, such conversation summary(ies) will be positioned at the top of the page and a real-time notification message will be shown 108. All participants in each conversation are shown with an image 109, 110, 111 whenever available. When an image is not available, the name (in text) is shown instead 112. A consistent visual indicator shows that certain participants are currently online and logged into the application 113, 114, presumably available for real-time conversation.

Figure 1B:
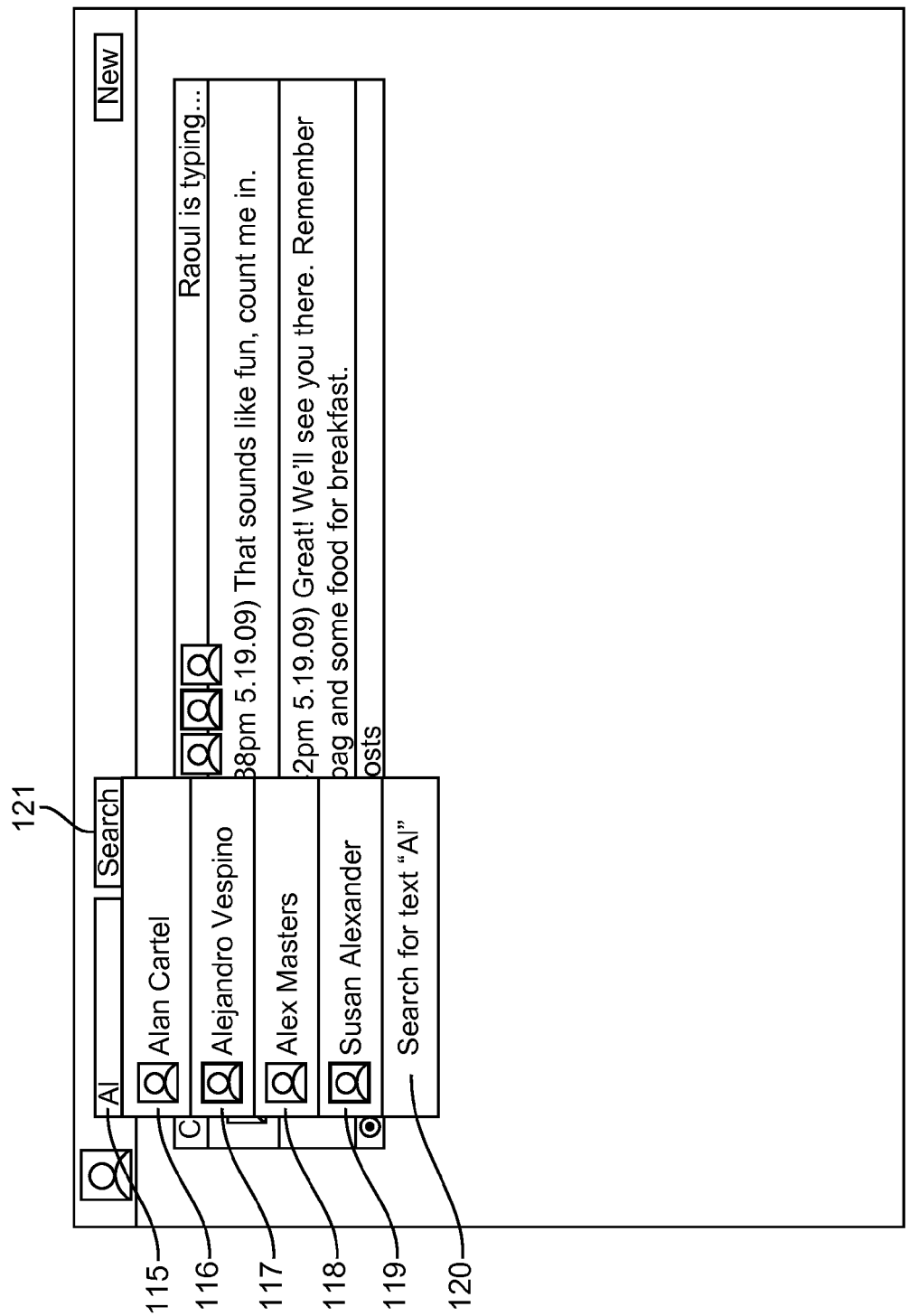

FIG. 1B illustrates how a user can filter conversations on the home page 100 by entering the first or last name of friends 115. As the user types the letters of the name, a list of all friends with first or last name with matching letters appears 116, 117, 118, and 119. In addition, the user can select to use the filter input field 115 to view all conversations that contain the text string entered by selecting the last item on the drop down list 120.

Figure 2A:
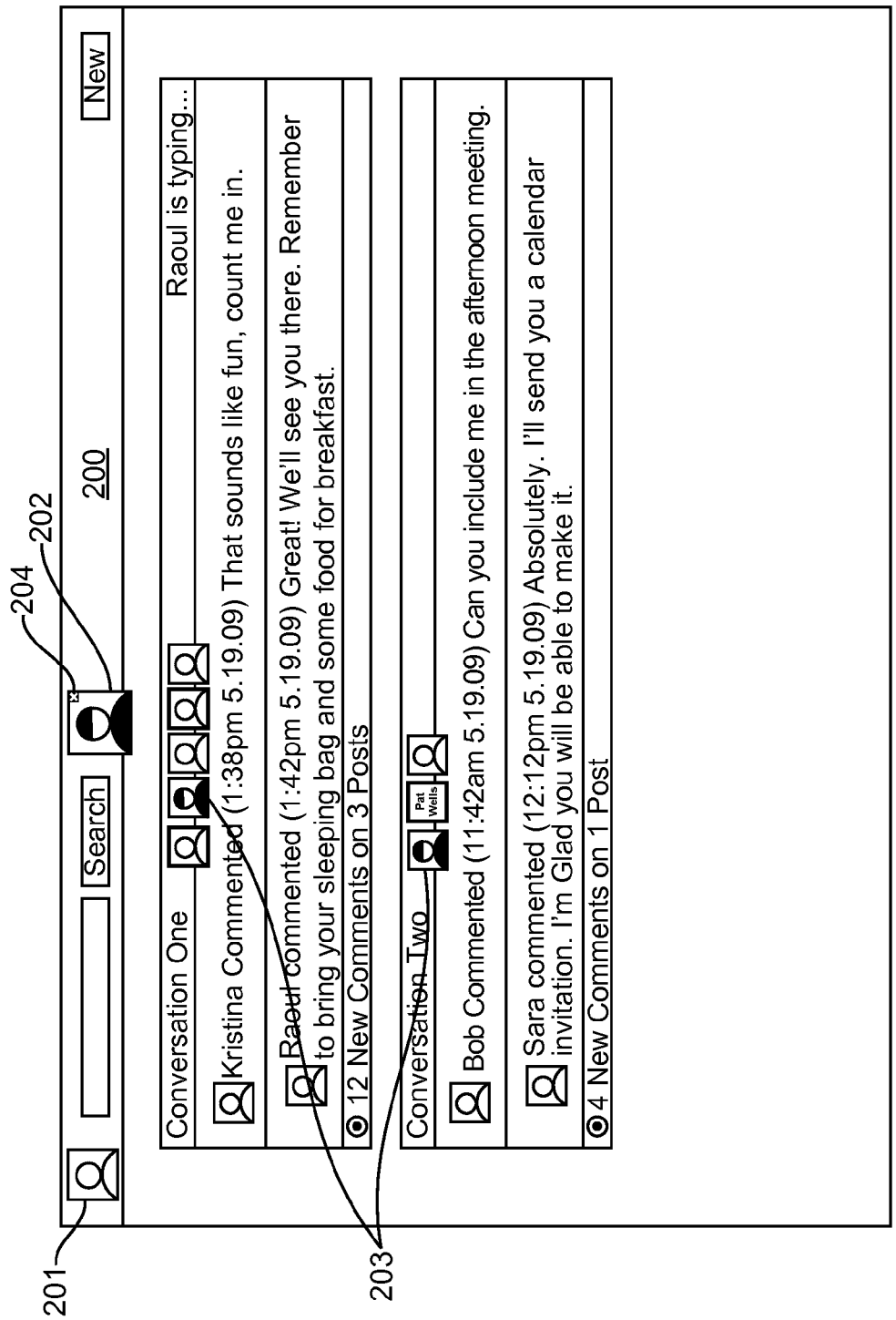
FIGS. 2A and 2B depict a view of conversation summaries filtered by the participation of one or more participant(s) in accordance with some embodiments.

FIG. 2A shows the core elements of the filtered conversation screen 200. Again, the image of the user 201 is prominently displayed. Likewise the image of the person selected in filtering process (described above in FIG. 1B) is shown 202 at the top of the page. At any time the user can deselect that person as the filter by clicking an 'x' icon over the image 204 indicating 'delete friend' from the filter.

Note that the person by whom the conversations were filtered 202 appears in all of the filtered conversations 203.

Figure 2B:
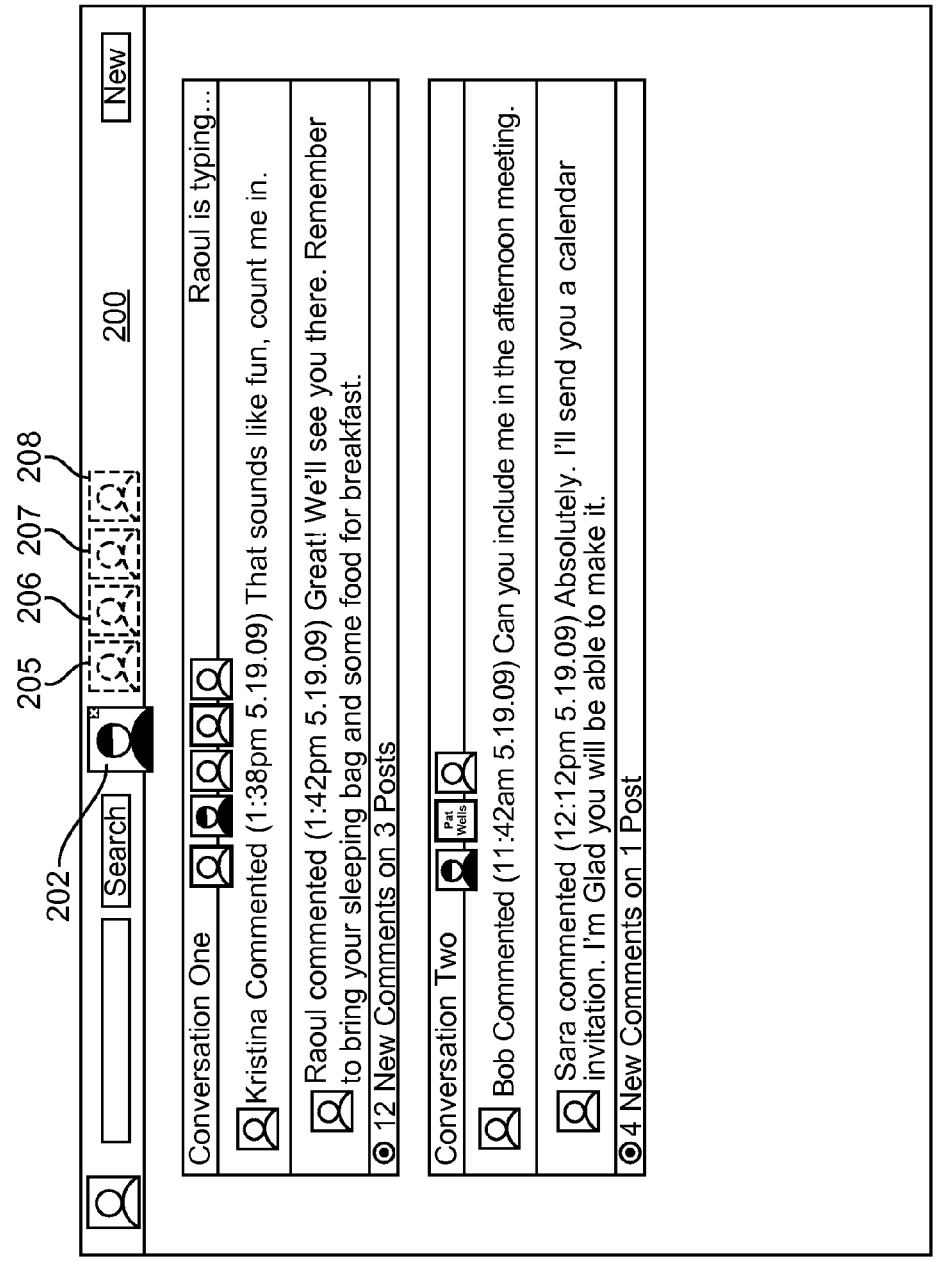

FIG. 2B shows the same filtered conversation screen 200 as the user filters the list of conversations further with the option to select additional friends 205, 206, 207, 208. The list of additional friends automatically appears in the background based on the closeness of relationship between the user and the friend(s) already selected. For example, friends of the user who are also friends of the friend selected on Facebook can appear in the background. If there are many friends in common among the user and the selection friend(s), those engaged more frequently in conversation will move to the front of the list. In the event that the user selects a group of participants that are not already involved in any conversation together, a message will be presented to the user indicating that no current conversations meet the filtering criteria and offering the option to start a new conversation with those participants.

Figure 3A:
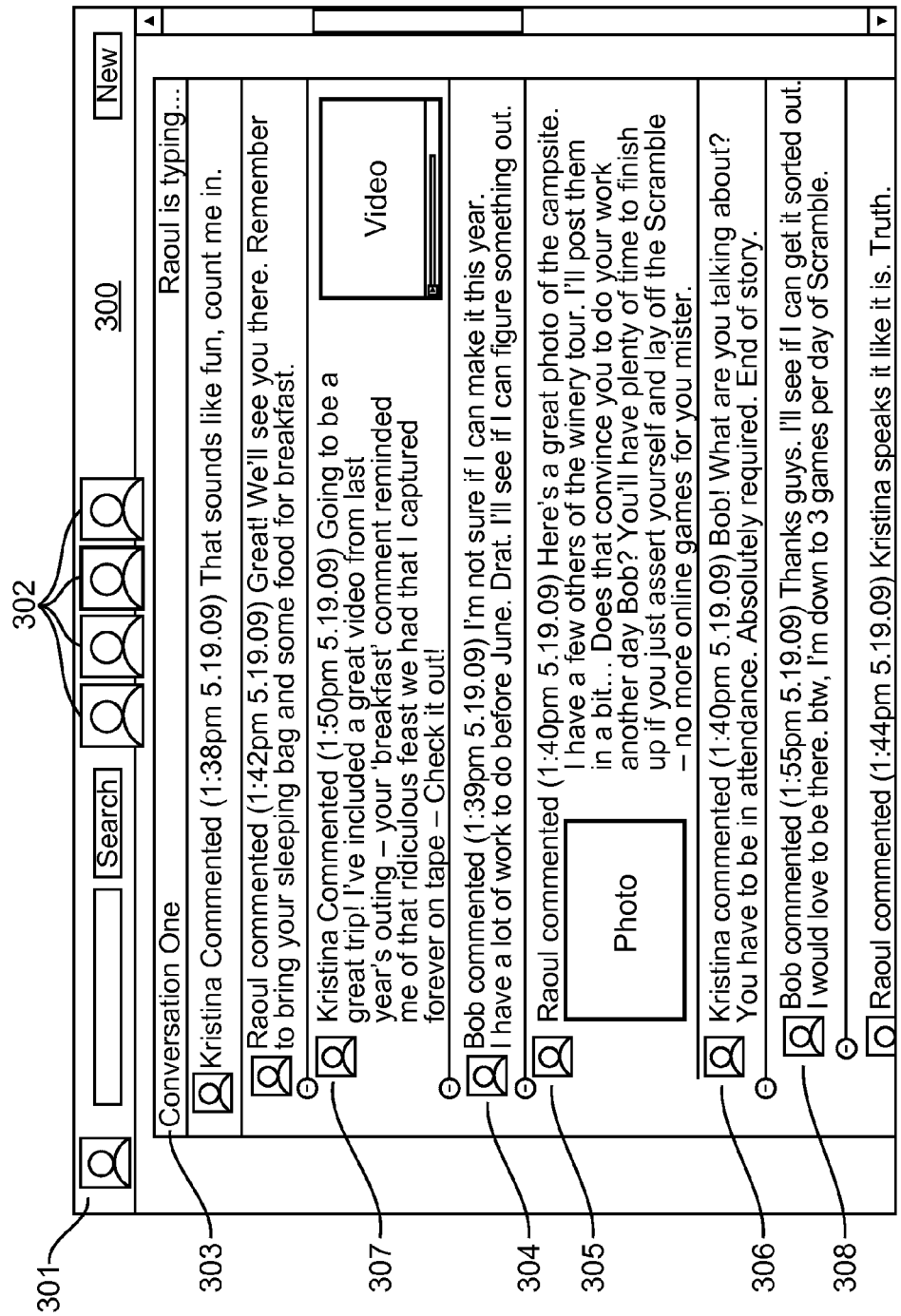

FIG. 3A shows a conversation detail screen 300 which the user navigates to by clicking one of the conversation summaries on either the home screen 100 or the filtered conversation screen 200. Now the entire screen is dedicated to a single conversation 303 with the images of current participants 302 of that conversation shown toward the top of the screen. Note that the comments contained in the conversation are presented in a hierarchical, tree structure indicating the logical relationship of comments in the course of conversation, regardless their chronological sequence of posting. For instance, the indentation of comment 305 indicates that is responding to comment 304. The fact that comment 306 is in line with 305 indicates they are responding to the same comment 304. Note that comment 307 was actually posted after comment 305 and comment 306, which respond to comment 304. This is an example of comments in a conversation being represented in their logical relationships to one another, regardless of the chronological order of their posting. Also note that one of the comments posted since the user last viewed the conversation 303 is highlighted 308.

Figure 3B:
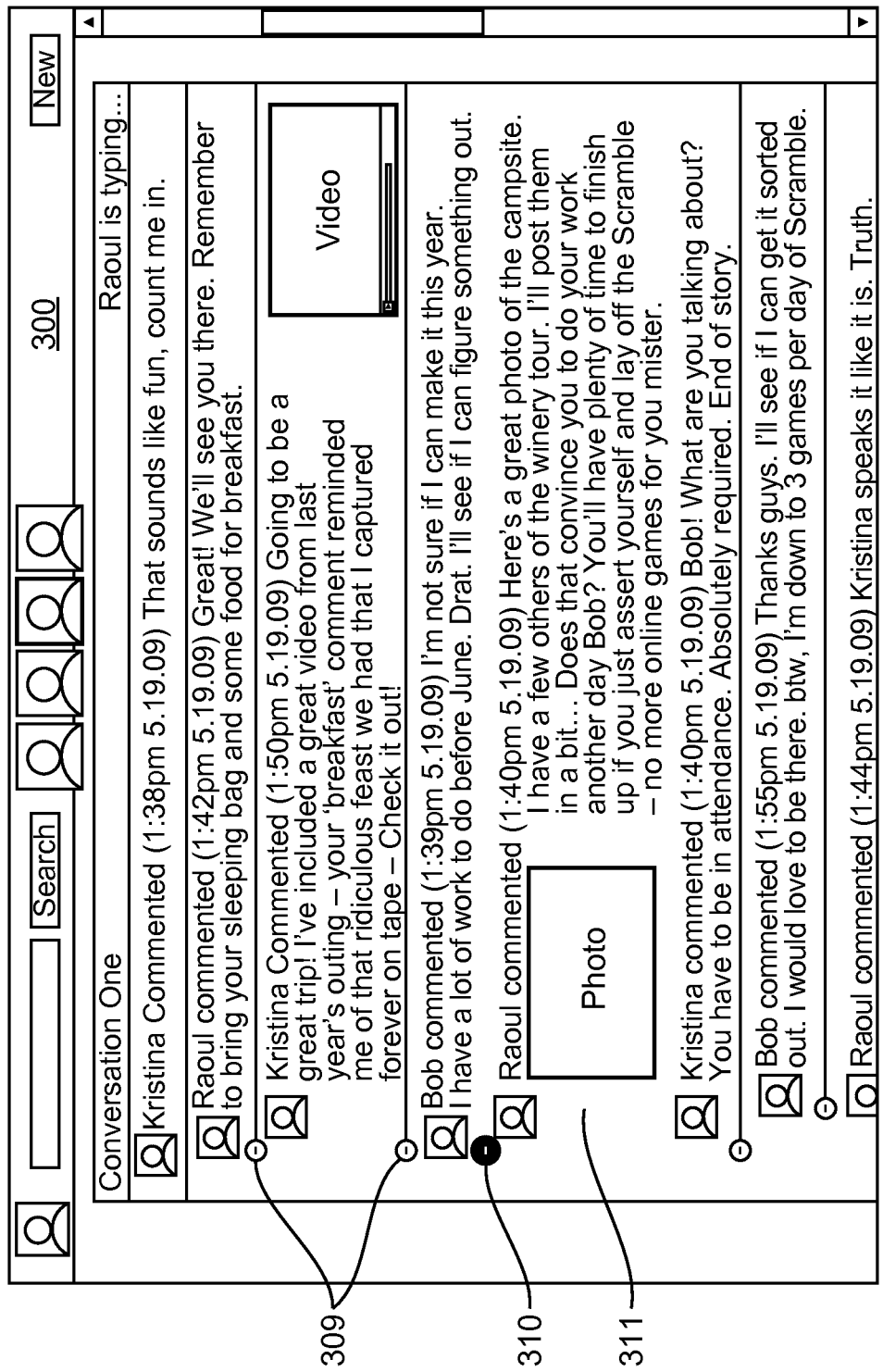

FIG. 3B shows the same conversation 300 as the user opts to collapse a branch of the conversation tree. The user can close any branch of the conversation by clicking an icon with a 'minus sign' (or the equivalent) 309, which collapses that comment and any detail that falls below it. When the user moves her cursor over a minus icon 310 the icon and all contents that will be collapsed when clicked 311 are highlighted.

Figures 2, 3C:
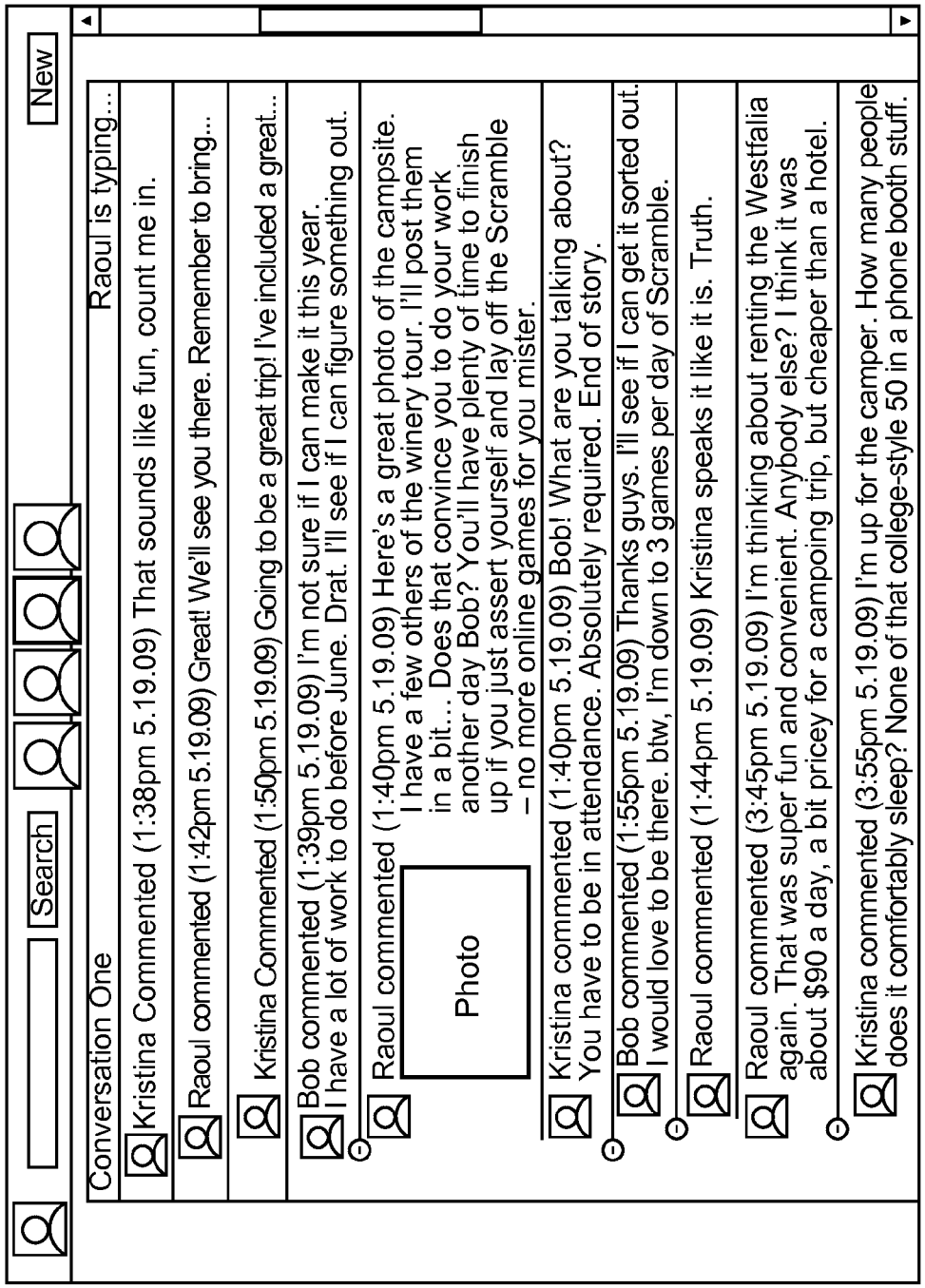

FIG. 3C shows the conversation detail screen 300 after the user clicked the minus sign in FIG. 3B 310. With that click, the minus sign icon 310 it changed to 'plus sign' 312 and a line appeared, indicating a collapsed comment or branch in the conversation. Clicking that plus sign icon expands the conversation view back to the state shown in FIG. 3B.

Figure 3D:

Expanding and collapsing branches of the conversation tree can be done in an automated fashion as well. FIG. 3C-1 shows an expanded conversation that goes beyond the length of user's screen. As the user scrolls down the page details at the top of the page are automatically collapsed and summarized in the hierarchical fashion described above. FIG. 3C-2 shows the conversation view after this collapsing of details above has occurred. FIG. 3D shows the conversation detail screen 300 after the collapsing of a comment or branch as described above in FIG. 3C. As the user moves her cursor over the conversation detail screen, highlighted lines 313 appear where a new comment can be inserted within the conversation. Along with this insertion line indicator 313, the preexisting comment, or paragraph within a comment, to which the new comment will be related is automatically highlighted 314. Note that in the cased shown, a new comment is being inserted within an existing comment, suggesting a response to a specific statement or question in the form of a paragraph.

Figure 3E:
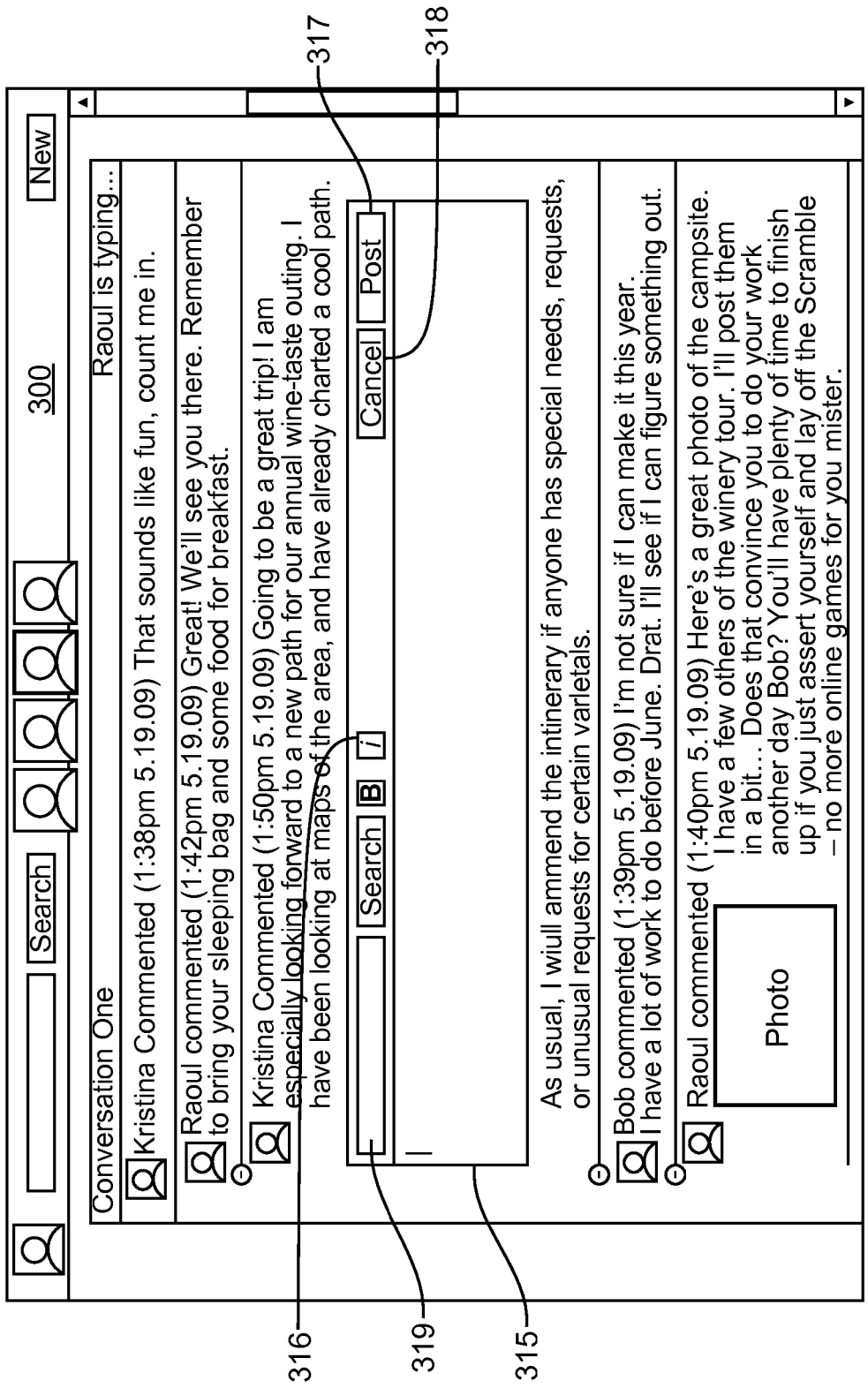

FIG. 3E shows the conversation detail screen 300 after the user has clicked on the insert comment indicator 313. The conversation tree expands to allow space for a comment editor box 315. Options relating to text format are shown as icons 316 in the editor box; in this case the option to format text as bold or italic is shown. If the user is satisfied with her comment, she can simply click the Post button 317. Alternatively, she can choose to cancel the comment altogether by clicking the Cancel button 318. In addition, the user can search for rich content from the web to add to the comment by typing into the search field 319 within the editor box 315.

Figure 3F:
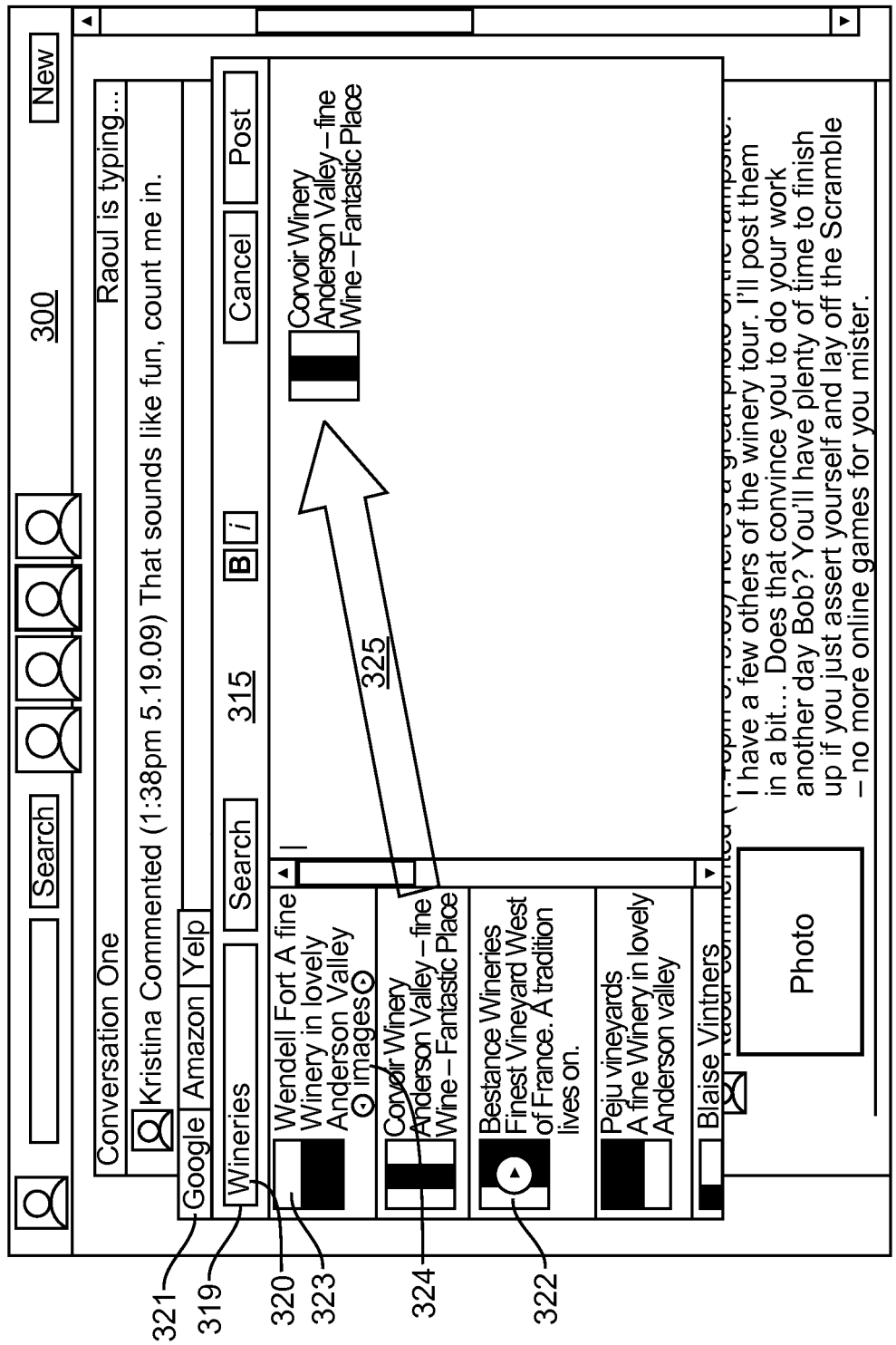

FIG. 3F shows the editor box 315 expanded to allow the user to conduct a search of the Web. The text entered in the search field 319 now appears as the search query 320. The user can change the source or type of the Web search by clicking on alternative tabs 321 positioned near the search field 319. For example, if a user wants to search the entire web, he can opt to use Google or Yahoo!, whereas he can want to use Amazon to search for a specific product or Yelp to search for a restaurant review. Where appropriate or required, additional fields can be added automatically for refinement of searches. For example a product category drop-down menu field can be added to refine an Amazon.com catalog search or a location field can be added to a Yelp restaurant search. In some embodiments, public or private application programming interfaces (or APIs) with various different search engines is used, sending the search queries and receiving results in real time. Each search query return from a given search tab is consistently formatted as a search return object 322. Commercial arrangements can be made with content and search providers such that fees are charged for: inclusion in this search functions; technical and user interface integration services; and placement in ordering of tabs. The format of the search return object 322 can vary with the search engine used to return results. In all cases, search results will contain a link that the user can click to see the referenced Web page opened in a new window or tab in the browser. Where available (and allowed by the search engine terms of use) an image 323 will be included in the search result, providing a visual clue to the contents of the referenced Web page. Also, where available (and allowed the by the search engine terms or use and copy rights of the Web page), media clips (e.g., audio, video or animations) can be included in the search results; in such cases, the user can click on the media object to play the media object within the search return object 322. Where there is more than one image available on the referenced Web page, an image selector 324 allows the user to browse the images and select one that is most representative to be shared with other participants in the conversation. All search results can be dragged and dropped 325 into the editor box 315 by the user clicking any part of the search result object, holding down the select button on her mouse and dragging the object to the preferred location in the editor box 315 and releasing the mouse at that point (for example, justified to the left or right of the text). The user can enter text into editor before or after adding rich (a) search result(s) to the comment. Any participant in the conversation can click the web content object contained in a comment. Commercial arrangements can be made with web merchants of products and services such that commissions are paid when users who click on a content object make purchases at the site of the object's referenced origin.

Thus, embodiments disclosed herein provide an improved online communications by allowing continuous conversations spanning asynchronous and synchronous modes of communication. These techniques also improve on the graphical representation of conversations, supporting a more natural flow of topics and participants. These techniques also provide improved methods of finding and seamlessly integrating rich content from the Web into online conversations. And these techniques integrate content and profiles from social networks into conversations as well.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving from a user of a social networking system a request to initiate a new conversation;
initiating a conversation responsive to the request, the conversation provided within a conversation interface for managing conversations in the social networking system;
adding a plurality of users to the conversation;
receiving comments from one or more of the plurality of users in connection with the conversation;
sending for display to one or more of the plurality of users the plurality of comments received for the conversation in a tree-branch configuration such that comments added to the conversation are displayed in association with existing comments to which they respond;
receiving from a responding user a request to insert a response to one of the plurality of comments in the conversation;
in response to receiving the request to insert, providing a comment editor input box within the conversation interface to the responding user, wherein the tree-branch configuration expands to provide space for the comment editor input box;
providing a search box within the comment editor input box for searching content;
receiving a search term in the included search box from the responding user;
sending for display to the responding user one or more search results for the search term;
receiving a selection of one of the search results from the responding user;
including content from the selected search result into a response of the responding user within the comment editor input box, such that, when posted by the responding user and displayed to one or more of the plurality of users, the content from the selected search result is displayed in the conversation interface; and
receiving a request from the responding user to post the response from within the comment editor input box.

2. The method of claim 1, further comprising:
sending for display a plurality of search options in the interface indicating a plurality of search engines that may be used to search for content; and
receiving a selection of one of the plurality of search options from the responding user, wherein the search results are provided by the search engine associated with the s elected search option.

3. The method of claim 2, further comprising:
sending for display an additional field box in the interface for receiving an additional field associated with one of the plurality of search options;
receiving an input for the additional field box from the responding user, wherein the search results are qualified based on the input for the additional field box.

4. The method of claim 3, wherein one of the plurality of search options is a website for selling products and the additional field is a product or a category of products.

5. The method of claim 3, wherein one of the plurality of search options is a website for location based products or services and the additional field is a location.

6. The method of claim 1, wherein at least one of the search results comprises an image representing the search result.

7. The method of claim 1, wherein receiving a selection of one of the search results comprises receiving the selection as a dragged and dropped object from the search results to the comment editor input box.

8. The method of claim 1, wherein the plurality of comments are displayed to one or more of the plurality of users by hiding details about earlier comments when additional comments are added to the conversation.

9. The method of claim 1, wherein a request to insert the response of the responding user specifies an intermediate location of the one of the comments.

10. The method of claim 9, further comprising:
sending for display to one or more of the plurality of users the plurality of comments received for the conversation in a tree-branch configuration, the comment from the responding user starting a new branch from the specified intermediate location.

11. A method comprising:
sending for display to one or more of a plurality of users of a social networking system a plurality of comments received for a conversation in a tree-branch configuration such that comments added to the conversation are displayed in association with existing comments to which they respond;
receiving from a responding user a request to insert a response to one of a plurality of comments in the conversation;
in response to receiving the request to insert, providing a comment editor input box within a conversation interface for managing conversations in the social networking system, wherein the tree-branch configuration expands to provide space for the comment editor input box;
providing a search box within the comment editor input box for searching content;
receiving a search term in the included search box from the responding user;
sending for display to the responding user one or more search results for the search term;
receiving a selection of one of the search results from the responding user;
including content from the selected search result into a response of the responding user within the comment editor input box, such that, when posted by the responding user and displayed to one or more of the plurality of users, the content from the selected search result is displayed in the conversation interface; and
receiving a request from the responding user to post the response from within the comment editor input box.

12. The method of claim 11, further comprising:
sending for display a plurality of search options in the interface indicating a plurality of search engines that may be used to search for content; and
receiving a selection of one of the plurality of search options from the responding user, wherein the search results are provided by the search engine associated with the selected search option.

13. The method of claim 12, further comprising:
sending for display an additional field box in the interface for receiving an additional field associated with one of the plurality of search options;
receiving an input for the additional field box from the responding user, wherein the search results are qualified based on the input for the additional field box.

14. The method of claim 13, wherein one of the plurality of search options is a website for selling products and the additional field is a product or a category of products.

15. The method of claim 13, wherein one of the plurality of search options is a website for location based products or services and the additional field is a location.

16. The method of claim 11, wherein at least one of the search results comprises an image representing the search result.

17. The method of claim 11, wherein receiving a selection of one of the search results comprises receiving the selection as a dragged and dropped object from the search results to the comment editor input box.

18. The method of claim 11, wherein the plurality of comments are displayed to one or more of a plurality of users by hiding details about earlier comments when additional comments are added to the conversation.

19. The method of claim 11, wherein the request to insert a response to one of the comments from the responding user specifies an intermediate location of the one of the comments.

20. The method of claim 19, further comprising:
sending for display to one or more of the plurality of users the plurality of comments received for the conversation in a tree-branch configuration, the comment from the responding user starting a new branch from the specified intermediate location.

21. A method comprising:
receiving from a user of a social networking system a request to initiate a new conversation;
initiating a conversation responsive to the request, the conversation provided within a conversation interface for managing conversations in the social networking system;
adding a plurality of users to the conversation;
receiving comments from one or more of the plurality of users in connection with the conversation;
sending for display to one or more of the plurality of users the plurality of comments received for the conversation in a tree-branch configuration such that comments added to the conversation are displayed in association with existing comments to which they respond;
receiving input indicating one of the comments selected by a responding user of the plurality of users;
receiving a request to insert a response to the selected one of the comments from the responding user of the plurality of users;
in response to receiving the request to insert, providing a comment editor input box within the conversation interface to a responding user of the plurality of users, wherein the tree-branch configuration expands to provide space for the comment editor input box;
providing a search box within the comment editor input box for searching content;
receiving a search term in the included search box from the responding user of the plurality of users;
sending for display to the responding user of the plurality of users one or more search results for the search term;
receiving a selection of one of the search results from the responding user of the plurality of users;
including content from the selected search result into a comment from the responding user of the plurality of users within the comment editor input box, such that, when posted by the responding user of the plurality of users and displayed to one or more of the plurality of user the content from the selected search result is displayed in the conversation interface; and
sending for display to one or more of the plurality of users the response from the comment editor input box to the selected one of the comments, the response displayed in the tree-branch configuration such that the response is displayed in associated with the selected comment.

22. The method of claim 21, wherein the displayed response is intended to indicate that the response is associated with the selected comment.

* * * * *